Feb. 6, 1934.　　　　S. ISENBERG　　　　1,946,442
APPARATUS FOR MAKING FROZEN CONFECTIONS
Original Filed March 21, 1932　　2 Sheets-Sheet 1
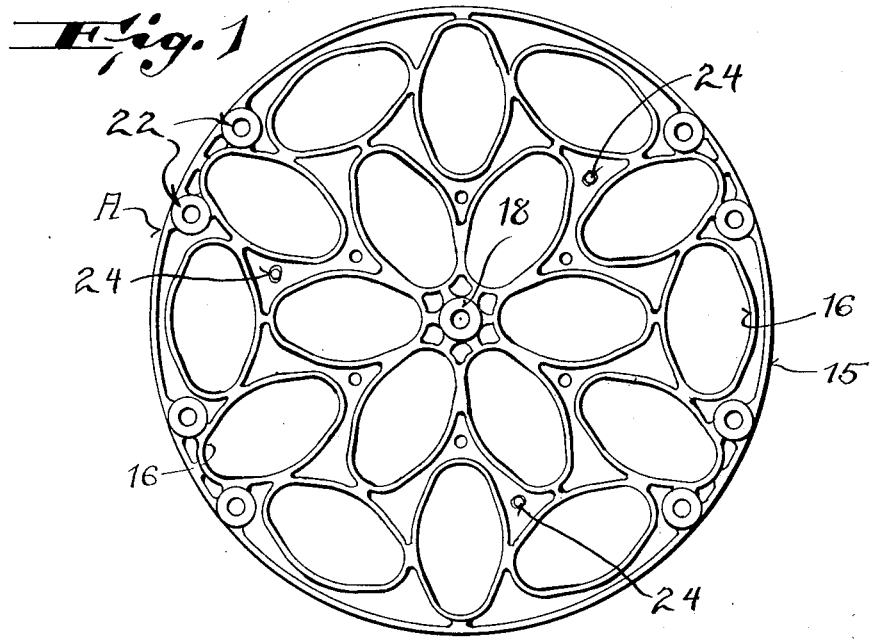
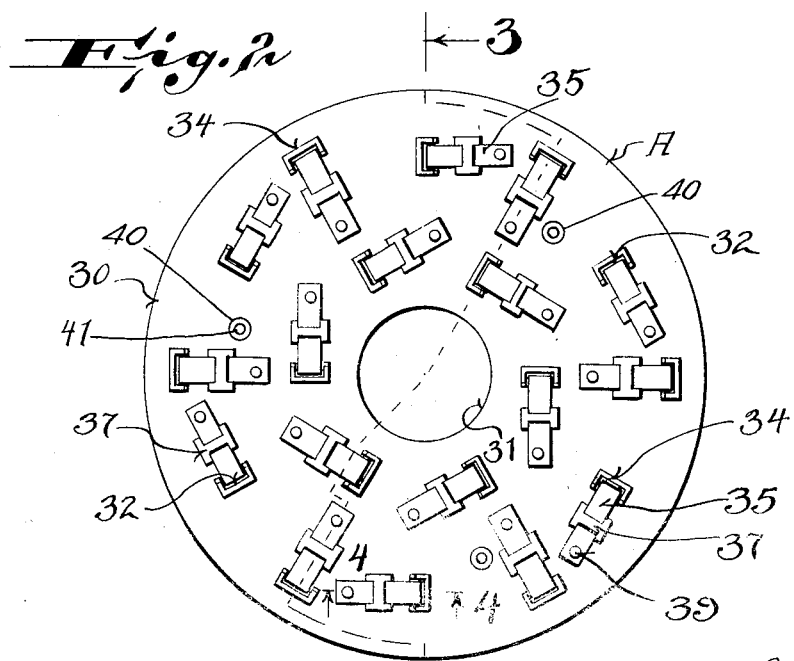
Inventor
S. Isenberg
By Young & Young
Attorneys

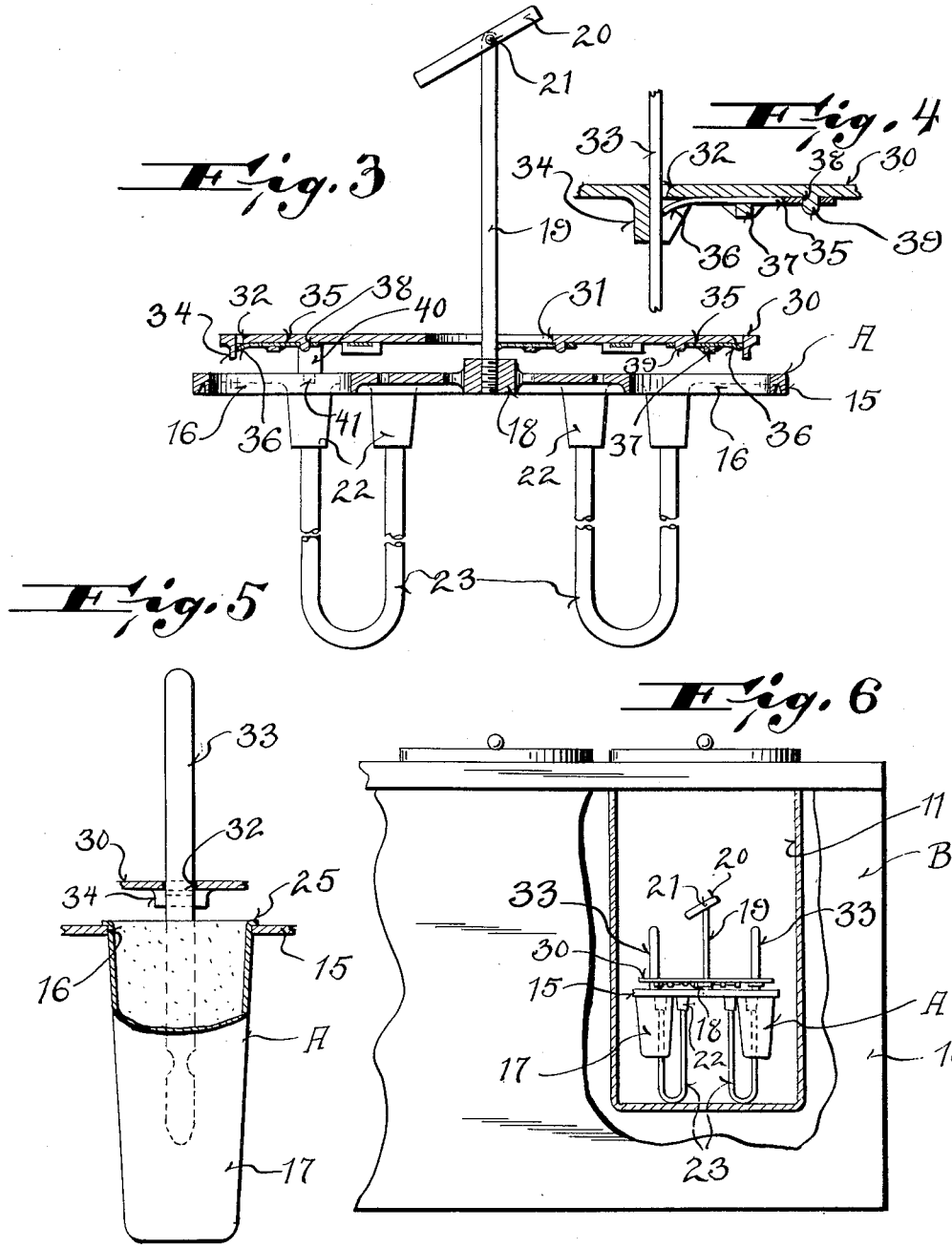

Patented Feb. 6, 1934

1,946,442

UNITED STATES PATENT OFFICE 1,946,442

APPARATUS FOR MAKING FROZEN CONFECTIONS

Stanley Isenberg, Chicago, Ill., assignor to Frozen Sweets, Inc., a corporation of Illinois Application March 21, 1932, Serial No. 600,195
Renewed October 26, 1933

3 Claims. (Cl. 107—19)

This invention appertains to a novel confection and method and apparatus for making the same, the frozen confection being of the type which is dispensed to the purchasers on the end of a stick, so that the confection can be held in the buyer's hand and eaten.

It is customary for manufacturers to make the confection on a large scale and sell and deliver the same to the small retail stores, who in turn supply the consumers. The method employed by all manufacturers to make the confection is by the so-called intense refrigeration process. The confection is frozen by this process very quickly, usually between three and fifteen minutes. This quick freezing does not result in the giving of a product of the best quality, as the confection is of a coarse texture. Further, this process requires an expensive equipment and cannot be practiced by small dealers.

One of the primary objects of my invention, therefore, is to provide an inexpensive equipment for use by the small retail dealers, whereby the frozen confection can be readily made on the premises, in the usual electric ice-cream cabinet or soda fountain, generally found in all drug stores, ice-cream parlors, confectionary stores, etc., at a small cost.

Another salient object of my invention is the provision of an inexpensive equipment for making frozen confections in conjunctions with an ordinary electric ice-cream cabinet, by means of which the confection can be slowly frozen, so as to result in the giving of a product having a smooth, uniform texture or grain, throughout the entire product.

A further important object of my invention is the provision of a small portable device for making a frozen confection of the type heretofore referred to, embodying a carrier plate for receiving a plurality of removable molds, the carrier plate being of a size to readily fit within the electric ice cream cabinet or soda fountain, and having supporting legs for engaging the bottom of the cans carried by the cabinet, the carrier plate having removably associated therewith, a stick plate which releasably carries a plurality of sticks for reception within the molds.

A further important object of my invention is the provision of a device of this character embodying a removable plate having associated therewith for supporting and carrying a plurality of sticks, with novel means for centering the plate relative to a carrier plate which detachably supports the molds, whereby the sticks will be simultaneously centered relative to the molds.

A further important object of my invention is the provision of novel means for detachably associating the sticks with the stick plate, whereby the sticks can be quickly associated with the plate and quickly removed therefrom after the confections have been frozen.

A still further object of my invention is to provide a device of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawings, in which:

Figure 1 is a bottom plan view of the carrier plate for the molds;

Figure 2 is a bottom plan view of the stick carrier plate illustrating the novel clamps carried thereby for detachably supporting and gripping the sticks;

Figure 3 is a vertical section showing the stick plate associated with the mold plate, the view being taken substantially on the section lines 3—3 of Figures 1 and 2, looking in the direction of the arrows, the molds not being shown in this view;

Figure 4 is an enlarged fragmentary vertical section illustrating one of the stick gripping means, taken on the line 4—4 of Figure 2;

Figure 5 is a fragmentary vertical section illustrating a mold associated with the mold carrier plate; and a stick supported by the stick plate and inserted in the mold; and, Figure 6 is a fragmentary side elevation of an electric refrigerated soda fountain or ice cream cabinet, with parts thereof broken away and in section and illustrating the use of my improved device therewith.

Referring to the drawings in detail, wherein similar reference characters designate corresponding parts throughout the several views, the letter A generally indicates my improved device for forming the frozen confections in an electric refrigerated ice cream cabinet or soda fountain B.

The electric refrigerated ice cream cabinet B can be of any preferred character or make and has merely been illustrated to show the use of my improved device in conjunction therewith. As shown in the drawings, the cabinet B may comprise a casing 10 having a plurality of cylindrical housings or cans 11 for receiving the usual removable cans of ice cream (not shown).

My improved device A comprises a circular mold carrier plate 15, which is preferably, but not necessarily made of cast metal. This plate 15 is provided with a plurality of novelly arranged openings 16 for receiving the removable molds 17 for the confection. As shown, the mold carrier plate 15 embodies a centrally disposed hub 18, having arranged radially therearound the center mold openings. Disposed around the centrally disposed mold openings is a circumferentially extending row of the mold openings. The hub 18 is internally threaded and receives the handle rod 19 carrying at its upper end the hand grip 20. This hand grip 20 is pivotally connected, as at 21, to the handle rod 19, so that the hand grip can be either disposed at right angles to the handle rod for facilitating the lifting of the mold plate, or parallel with the handle rod for a purpose, which will be later set forth.

The plate 15 at spaced points around its periphery is provided with pairs of depending sockets 22, which sockets detachably receive the upper ends of U-shaped supporting standards or legs 23.

Inward of the sockets 22, the plate 15 is provided with spaced slots 24, for a purpose, which will also be later set forth.

The molds 17 which are to be removably associated with the plate 15, are preferably formed of aluminum, and are of a substantially elliptical shape in plan and gradually taper from their upper ends toward their lower ends. The upper ends of all of the molds are provided with outstanding flanges 25 which rest on the upper surface of the mold carrier plate 15, when the molds are inserted in the openings 16.

Removably associated with the mold plate 15 is the stick carrier plate 30. This stick carrier plate 30 is also of a circular configuration and is provided with an axial opening 31, through which the handle rod 19 is inserted when the stick plate is associated with the mold plate. By tilting the handle in the manner specified, the stick carrier plate 30 can be readily associated with the mold plate.

I preferably pivot the handle grip 20 off center, so that the same will tend to swing to a parallel position with the handle rod. The stick carrier plate 30 is provided at spaced points with slots 32 for receiving the sticks 33 for the frozen confections and the lower face of the plate 30 carries novel means for detachably gripping the sticks.

This means comprises a depending rigid guide lug 34 arranged at one side of each opening 32 against which a stick is adapted to rest. The stick is held against its lug 34 by means of a flat leaf spring 35, with its inner end slightly flared downwardly, as at 36, and disposed in facing relation to its lug 34.

These springs 35 are slipped through slotted supporting lugs or feet 37 and the outer ends of the springs are provided with openings 38 in which are fitted the holding teats 39.

The clamps and the openings 32 are arranged in predetermined relation relative to the mold-receiving openings 16 in the mold carrier plate 15 and a clamp is provided for each mold.

In order to facilitate the proper location of the clamps relative to the molds, the lower face of the stick plate carries depending feet 40. These feet 40 have reduced lugs 41 thereon, which are adapted to fit within the slots or openings 24 formed in the mold plate. The feet 40 form means for spacing the stick carrier plate 30 from the mold plate.

In use of my improved device, the molds 17 are filled with the flavored liquid, which is to be frozen, and the molds carried by the mold plate 15 are inserted by means of the hand grip 20 and the handle rod 19 into the refrigerated cabinet.

After the liquid has been partially frozen and the stick plate 30 has been positioned in place, the sticks 33 are inserted in the stick plate and into the various molds. This will properly dispose the sticks 33 within the partially frozen liquid.

It is to be noted that the sticks do not extend to the bottom of the molds and the mold plate 30 serves as a means for carrying the sticks and for properly locating the sticks relative to the molds.

When the confections have been frozen, the entire device A is removed from the refrigerated cabinet by means of the hand grip 20, after which the device is immersed in tepid water. This loosens all of the molds 17 from the frozen confections, after which the edge of the stick carrier plate can be grasped by the operator for lifting all of the confections from the molds. If desired, two of the protruding sticks can be held by the operator which will lift the stick plate as well as the confections from the molds. After the stick plate with the frozen confections have been lifted, the same can be readily stripped from the plate and are suitably wrapped and placed back in the cabinet B for sale.

While I have specified that the confections are partially frozen before the sticks are placed in position in the molds, it is to be noted that the entire device can be assembled with the sticks in place prior to the placing of the device within the cabinet for freezing.

According to my process of freezing the confections within an ordinary refrigerated ice-cream cabinet or the like, a considerable period of time, namely, several hours is required to properly congeal or freeze the confections. This insures a smooth, uniform texture throughout the confections.

While in the drawings I have illustrated a preferred form of my invention, it is to be understood that various changes can be made thereto. Thus, if desired, the molds can be permanently connected with the mold plate, or secured thereto rigidly, in any desired way.

I also contemplate the use of paper molds or cups, which can be inserted within the openings 16 of the mold plate 15. Where paper molds or cups are utilized, the same are left on or dispensed with the frozen confections. This entirely eliminates the necessity of wrapping the frozen confections after the same have been formed by the use of the molds described in my preferred form. Likewise, I have found out that the confections can be more readily frozen, where the air is circulated past the molds in the refrigerated cabinet. Thus, if desired, I can employ an electric fan placed in the refrigerated cabinet for creating a draft of the cooled air past the mold.

Changes in details may be made without departing from the spirit or the scope of my invention, but what I claim as new is:

1. A portable device for freezing confections in an ordinary ice cream cabinet or the like comprising a mold plate having a plurality of predeterminedly arranged openings therein, a plurality of molds detachably fitted in said openings, said mold plate also having slots therein, a stick carrier plate arranged above the mold plate having depending feet provided with reduced lugs for fitting within said slots whereby to locate the stick carrier plate in predetermined relation to the mold plate, said carrier plate having a plurality of stick receiving openings therethrough, depending lugs formed on the carrier plate at one side of the openings therein, and leaf springs connected with the carrier plate having the ends thereof arranged adjacent to said lugs for releasably holding the sticks against said lugs.

2. A portable device for freezing confections in an ordinary ice cream cabinet or the like comprising a mold plate having a plurality of predeterminedly arranged openings therein, a plurality of molds detachably fitted in said openings, said mold plate also having slots therein, a stick carrier plate arranged above the mold plate having depending feet provided with reduced lugs for fitting within said slots whereby to locate the stick carrier plate in predetermined relation to the mold plate, said carrier plate having a plurality of stick receiving openings therethrough, depending lugs formed on the carrier plate at one side of the openings therein, leaf springs connected with the carrier plate having the ends thereof arranged adjacent to said lugs for releasably holding sticks against said lugs, an axially disposed handle rod secured to the mold plate, and a hand grip pivotally connected to the upper end of the handle rod, said carrier plate having an enlarged axially disposed opening for receiving the handle rod.

3. A portable device for freezing confections within an ordinary refrigerated ice cream cabinet or the like, comprising a mold plate having a plurality of predeterminedly arranged openings therein, a plurality of molds detachably fitted within said openings, supporting legs connected with the mold plate and extending below the molds, a carrier plate arranged above the mold plate, means detachably connecting the carrier plate with the mold plate, said carrier plate having a plurality of slots therein, depending lugs formed on the carrier plate at one side of the slots, the lower face of the carrier plate having a holding teat and a slotted lug arranged on the opposite side of each slot from the depending lug and a removable spring for each opening inserted through the slots of the slotted lugs, one end of the springs having openings for receiving the holding teats.

STANLEY ISENBERG.